(12) United States Patent
Kannan et al.

(10) Patent No.: US 9,959,129 B2
(45) Date of Patent: May 1, 2018

(54) HEADLESS TASK COMPLETION WITHIN DIGITAL PERSONAL ASSISTANTS

(71) Applicant: Microsoft Technology Licensing, LLC, Redmond, WA (US)

(72) Inventors: Vishwac Sena Kannan, Redmond, WA (US); Aleksandar Uzelac, Seattle, WA (US); Daniel J. Hwang, Renton, WA (US); Robert L. Chambers, Sammamish, WA (US); Thomas Soemo, Redmond, WA (US); Adina Magdalena Trufinescu, Redmond, WA (US); Khuram Shahid, Seattle, WA (US); Ali Emami, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 384 days.

(21) Appl. No.: 14/593,584

(22) Filed: Jan. 9, 2015

(65) Prior Publication Data

US 2016/0203002 A1    Jul. 14, 2016

(51) Int. Cl.
  *G10L 21/00*   (2013.01)
  *G06F 9/44*   (2018.01)
  (Continued)

(52) U.S. Cl.
  CPC .......... *G06F 9/4446* (2013.01); *G06F 3/0484* (2013.01); *G06F 3/162* (2013.01);
  (Continued)

(58) Field of Classification Search
  USPC ..... 704/246, 247, 251, 252, 270, 270.1, 275
  See application file for complete search history.

(56) References Cited

U.S. PATENT DOCUMENTS 8,595,642 B1   11/2013  Lagassey
9,741,343 B1 *  8/2017  Miles ................... G10L 15/265
(Continued)

FOREIGN PATENT DOCUMENTS

CN    102510426 A    6/2012
CN    103257787 A    8/2013
CN    103593230       2/2014

OTHER PUBLICATIONS

International Search Report and Written Opinion, International Application No. PCT/US2015/067759, dated Apr. 4, 2016, 11 pages.

(Continued)

*Primary Examiner* — Leonard Saint Cyr
(74) *Attorney, Agent, or Firm* — Klarquist Sparkman, LLP

(57) ABSTRACT

Techniques are described for headlessly completing a task of an application in the background of a digital personal assistant. For example, a method can include receiving a voice input via a microphone. Natural language processing can be performed using the voice input to determine a user voice command. The user voice command can include a request to perform a task of the application. The application can be caused to execute the task as a background process without a user interface of the application appearing. A user interface of the digital personal assistant can provide a response to the user, based on a received state associated with the task, so that the response comes from within a context of the user interface of the digital personal assistant without surfacing the user interface of the application.

19 Claims, 10 Drawing Sheets

(51) Int. Cl.
*G06F 3/0484* (2013.01)
*G06F 3/16* (2006.01)
*G10L 15/18* (2013.01)
*G10L 15/22* (2006.01)
*G06F 9/48* (2006.01)

(52) U.S. Cl.
CPC ............ *G06F 3/167* (2013.01); *G06F 9/4843* (2013.01); *G10L 15/1822* (2013.01); *G10L 15/22* (2013.01); *G10L 2015/223* (2013.01)

(56) References Cited

U.S. PATENT DOCUMENTS

| | | | | |
|---|---|---|---|---|
| 2006/0253287 | A1* | 11/2006 | Kammerer | 704/275 |
| 2012/0209946 | A1 | 8/2012 | McClure et al. | |
| 2013/0111377 | A1* | 5/2013 | Newman | G06F 3/048 715/764 |
| 2013/0176328 | A1* | 7/2013 | Pillai | G01C 21/3632 345/592 |
| 2013/0345980 | A1 | 12/2013 | Van Os et al. | |
| 2014/0095173 | A1* | 4/2014 | Lynch | G10L 15/22 704/275 |
| 2014/0258469 | A1* | 9/2014 | Maharajh | G06F 17/30035 709/219 |
| 2014/0270146 | A1* | 9/2014 | Riahi | G06N 99/005 379/265.13 |
| 2014/0278419 | A1 | 9/2014 | Bishop et al. | |
| 2014/0282208 | A1* | 9/2014 | Chaudhri | G06F 3/04883 715/779 |
| 2014/0365227 | A1 | 12/2014 | Cash et al. | |
| 2015/0127819 | A1* | 5/2015 | Cimino | H04L 43/0876 709/224 |

OTHER PUBLICATIONS

H., Michael, "SayIt for BlackBerry 10 gets massive update to v3.0—now Headless", Published on: Jan. 7, 2014 Available at: http://blackberryempire.com/sayit-blackberry-10-massive-update-v3.0-headless/ (4 pages).

Krols, Diederik, "Integrating Cortana in your Universal Windows Phone app", Published on: Oct. 20, 2014 Available at: http://blogs.u2u.be/diederik/post/2014/10/20/Integrating-Cortana-in-your-Universal-Windows-Phone-app.aspx (17 pages).

Tweedie, Steven, "BlackBerry Users Are Getting Their Own Siri-Like Assistant Soon", Published on: Jul. 16, 2014 Available at: http://www.businessinsider.in/BlackBerry-Users-Are-Getting-Their-Own-Siri-Like-Assistant-Soon/articleshow/38496255.cms (5 pages).

Sur, Abhishek, "Guest Post: Integrating your Application to work with Cortana in Windows Phone 8.1", Published on: Aug. 23, 2014 Available at: http://blogs.technet.com/b/southasiamvp/archive/2014/08/23/integrating-your-application-to-work-with-crotana-in-windows-phone-8-1.aspx (5 pages).

P., Chris, "Google Now vs Siri vs Cortana: showdown", Published on: Sep. 18, 2014 Available at: http://www.phonearena.com/news/Google-Now-vs-Siri-vs-Cortana-showdown_id59877 (25 pages).

"Assistant—Virtual Voice Assistant—Dictate Commands with Voice Recognition, Ask Questions via Speech", Retrieved on: Oct. 30, 2014 Available at: https://itunes.apple.com/in/app/assistant-virtual-voice-assistant/id491854246?mt=8 (3 pages).

"The Intelligent Mobile Assistant for How you Live, Work and play", Published on: Oct. 27, 2012 Available at: http://www.dragonmobileapps.com/android/ (10 pages).

"Robin", Published on: Sep. 22, 2012 Available at: http://robingets.me/ (2 pages).

Zhong, et al., "JustSpeak: Enabling Universal Voice Control on Android", In Proceedings of the 11th Web for All Conference, Apr. 7, 2014, (4 pages).

Rubin, Ross, "Unlike Siri, Cortana plays well with others", Published on: Sep. 2, 2014 Available at: http://www.cnet.com/news/unlike-siri-cortana-plays-well-with-others/ (7 pages).

"International Preliminary Report on Patentability Issued in PCT Application No. PCT/US2015/067759", dated Mar. 31, 2017, 7 Pages.

Second Written Opinion Issued in PCT Application No. PCT/US2015/067759, dated Dec. 19, 2016, 4 Pages.

Office Action Issued in related Columbian Patent Application No. 2017/0007028, dated Jul. 26, 2017, 3pp.

* cited by examiner

FIG. 4

```
  <CommandSet Name="MovieAppServiceTest">

<AppName>MovieAppService</AppName>
    <Example>Add movieName</Example>

<!-- activationType on a command can be either background or foreground. As an
example, it can be treated as foreground by default -->
      <Command Name="Add" ActivationType="background">
        <Example>Add the movieName to my MovieAppService queue</Example>
        <ListenFor>Add [the] {movieName} to [my] Queue</ListenFor>
        <ListenFor>Add [the] {movieName} to [my] {builtin:AppName} Queue</ListenFor>
        <Feedback>{builtIn:ackPhrase}, adding {movieName} to your queue</Feedback>

<!-- Responses can be optional and so can individual Response child states. If the
app does not provide a response for a specific state, a canned response can be displayed.
-->
        <Responses>

<Response Name="SuccessMovieAdded" State="Success">
            <DisplayString>{builtIn:success}, I've got that done for you</DisplayString>
            <TTSString>{builtIn:success}, I've got that done for you</TTSString>
            <AppDeepLink URL="/showQueue.xaml?movieAdded=true">View my MovieAppService
Queue
            <WebLink URL="http://www.MovieAppService.com/myQueue">Manage queue on
MovieAppService.com
</WebLink>
          </Response>

<Response Name="FailureMovieNotAdded" State="Failure">
            <DisplayString>{builtIn:failure}, that didnt work. Let's try to do this in the
{builtIn:appName} app</DisplayString>
            <TTSString>{builtIn:failure}, that didnt work. Let's try to do this in the
{builtIn:appName} app</TTSString>
            <AppDeepLink></AppDeepLink>
            <WebLink></WebLink>
          </Response>

</Responses>

<!- In case of Headless invocation, the Navigate element can point to the appService to
launch when this command is hit -->
        <Navigate Target="AppName-VoiceCommandService"/>
      </Command>

</CommandSet>
```

HEADLESS TASK COMPLETION WITHIN DIGITAL PERSONAL ASSISTANTS

BACKGROUND

As computing technology has advanced, increasingly powerful computing devices have become available. For example, computing devices are increasingly adding features such as speech recognition. Speech can be an effective way for a user to communicate with a computing device, and speech controlled applications are being developed, such as speech-controlled digital personal assistants.

A digital personal assistant can be used to perform tasks or services for an individual. For example, the digital personal assistant can be a software module running on a mobile device or a desktop computer. Examples of tasks and services that can be performed by the digital personal assistant can include retrieving weather conditions and forecasts, sports scores, traffic directions and conditions, local and/or national news stories, and stock prices; managing a user's schedule by creating new schedule entries, and reminding the user of upcoming events; and storing and retrieving reminders.

However, it is likely that the digital personal assistant cannot perform every task that a user may want to have performed. Therefore, there exists ample opportunity for improvement in technologies related to speech-controlled digital personal assistants.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for headlessly completing a task of an application in the background of a digital personal assistant. For example, a method can be implemented by a computing device comprising a microphone. The method can comprise receiving, by a voice-controlled digital personal assistant, a digital voice input generated by a user. The digital voice input can be received via the microphone. Natural language processing can be performed using the digital voice input to determine a user voice command. The user voice command can comprise a request to perform a pre-defined function of a third-party voice-enabled application. The pre-defined function can be identified using a data structure that defines functions supported by available third-party voice-enabled applications using voice input. The third-party voice-enabled application can be caused to execute the pre-defined function as a background process without a user interface of the third-party voice-enabled application appearing on a display of the computing device. A response can be received from the third-party voice-enabled application indicating a state associated with the pre-defined function. A user interface of the voice-controlled digital personal assistant can provide a response to the user, based on the received state associated with the pre-defined function, so that the response comes from within a context of the user interface of the voice-controlled digital personal assistant without surfacing the user interface of the third-party voice-enabled application.

As another example, computing devices comprising processing units, memory, and one or more microphones can be provided for performing operations described herein. For example, a method performed by the computing device can include receiving speech input generated by a user via the one or more microphones. Speech recognition can be performed using the speech input to determine a spoken command. The spoken command can comprise a request to perform a task of a third-party application. The task can be identified using a data structure that defines tasks of third-party applications invokable by spoken command. It can be determined whether the task of the third-party application is capable of being headlessly executed. The third-party application can be caused to execute as a background process to headlessly execute the task when it is determined that the task of the third-party application is capable of being headlessly executed. A response from the third-party application can be received indicating a state associated with the task. A user interface of the speech-controlled digital personal assistant can provide a response to the user, based on the received state associated with the task, so that the response comes from within a context of user interface of the speech-controlled digital personal assistant without surfacing the user interface of the third-party application.

As another example, computing devices comprising processing units and memory can be provided for performing operations described herein. For example, a computing device can perform operations for completing a task of a voice-enabled application within the context of a voice-controlled digital personal assistant. The operations can comprise receiving a digital voice input generated by a user at the voice-controlled digital personal assistant. The digital voice input can be received via a microphone. Natural language processing can be performed using the digital voice input to determine a user voice command. The user voice command can comprise a request to perform the task of the voice-enabled application. The task can be identified using an extensible data structure that maps user voice commands to tasks of voice-enabled applications. It can be determined whether the task of the voice-enabled application is a foreground task or a background task. When it is determined that the task is a background task, the voice-enabled application can be caused to execute the task as a background task and within a context of the voice-controlled digital personal assistant without a user interface of the voice-enabled application surfacing. A response from the voice-enabled application can be received. The response can indicate a state associated with the task. A response can be provided to the user based on the received state associated with the task. The response can be provided within the context of the voice-controlled digital personal assistant without a user interface of the voice-enabled application surfacing when it is determined that the task is a background task.

As described herein, a variety of other features and advantages can be incorporated into the technologies as desired.

BRIEF DESCRIPTION OF THE DRAWINGS

FIG. 4 is an example of a command definition that can be used to create a data structure for enabling an interface between an application and a digital personal assistant.

DETAILED DESCRIPTION

Overview

Figure 1:
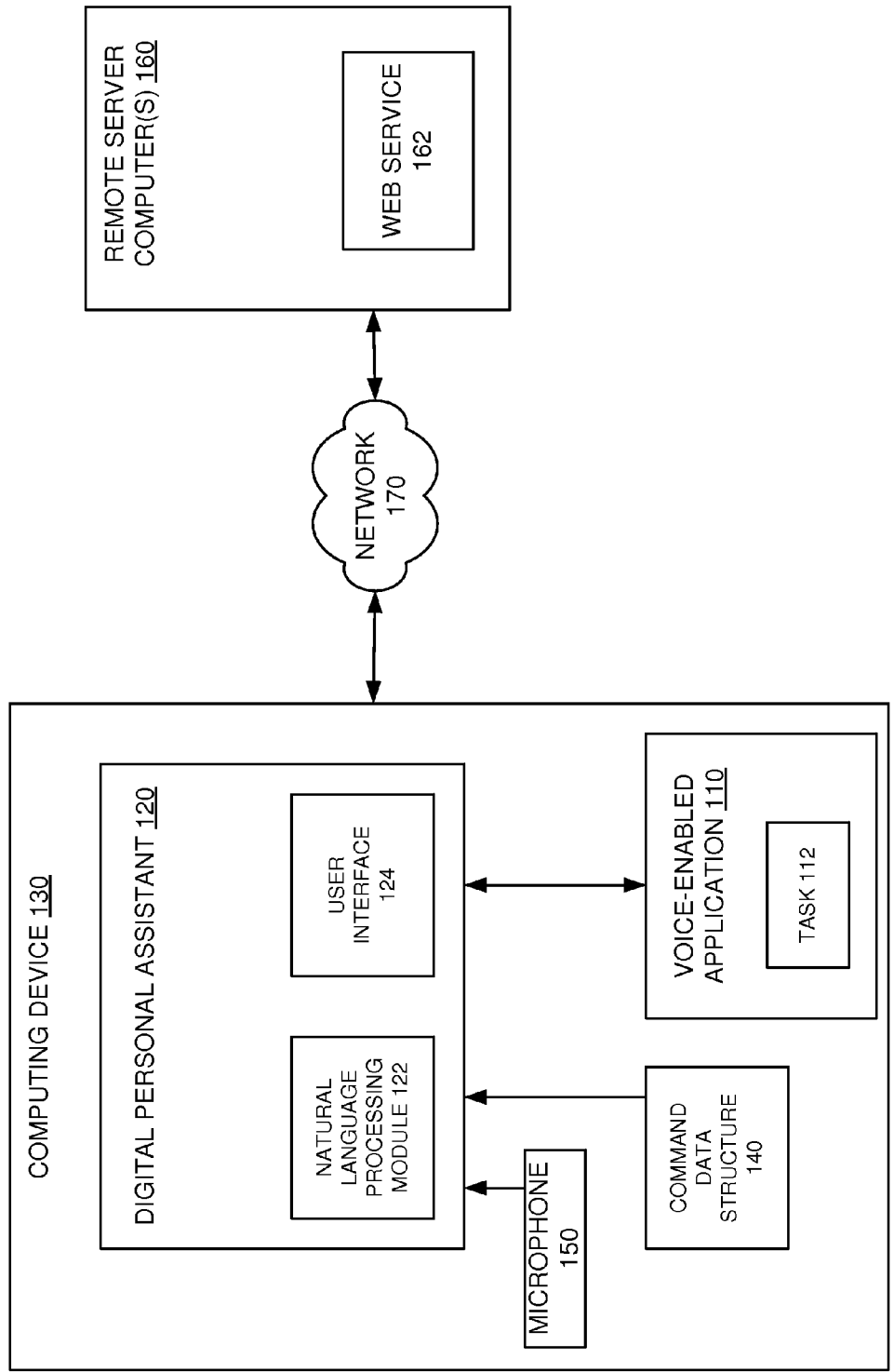
FIG. 1 is a diagram depicting an example of a system for headlessly completing a task of an application in the background of a digital personal assistant.

As a user grows more comfortable with using the digital personal assistant, the user may prefer to perform more actions within the context of the digital personal assistant. However the provider of the digital personal assistant cannot predict or spend the time to develop every application that a user may desire to use. Thus, it can be desirable for the digital personal assistant to be capable of calling or launching third-party applications that are created by entities other than the provider of the digital personal assistant.

In a typical solution, the user interface of the application is surfaced when the digital personal assistant launches the application and program control passes from the digital personal assistant to the application. Once the user interface of the application surfaces, the user can verify the status of the request and the user can perform additional tasks from within the application. To return to the user interface of the digital personal assistant, the user must exit the application before control can be returned to the digital personal assistant.

As one specific example of using a digital personal assistant of a mobile phone, the user can request that a movie be added to the user's queue using a movie application installed on the mobile phone. For example, the user can say "Movie-Application, add Movie-X to my queue" to the user interface of the digital personal assistant. After the command is spoken and recognized by the assistant, the assistant can start the movie application which will present the user interface of the movie application. The movie can be added to the user's queue and the queue can be presented to the user as verification that the movie was added. The user can continue to use the movie application or the user can close the movie application to return to the user interface of the digital personal assistant.

When the digital personal assistant transitions control to the application, loading the application and its user interface into memory can take a perceptible amount of time. The delay can potentially impact the user's productivity, such as by delaying the user from accomplishing a follow-on task and/or by interrupting the user's train of thought. For example, the user's attention can be directed to closing the application before returning to the user interface of the digital personal assistant. Furthermore, by transitioning control to the application, contextual information available to the digital personal assistant may not be available to the application. For example, the digital personal assistant may understand the identity and contact information of the user's spouse, the location of the user's home or office, or the location of a daycare provider of the user, but the application may not have access to the contextual information.

In the techniques and solutions described herein, a digital personal assistant can determine if a task of a third-party application can be performed in the background, so that operations for performing the task are performed within the context of the digital personal assistant and without a user interface of the voice-enabled application surfacing. Thus, the user can experience that a given set of tasks are performed within the context of the digital personal assistant, as opposed to the context of the application that is doing the user task. Furthermore, power of the device can potentially by reduced (and battery life prolonged) since the user interface of the application is not loaded into memory when the task of the application is performed in the background.

Applications can register with the digital personal assistant to expand on the list of native capabilities the assistant provides. The applications can be installed on a device or called over a network (such as the Internet) as a service. A schema definition can enable applications to register a voice command with a request to be launched headlessly when a user requests that command/task. For example, the applications can include a voice command definition (VCD) file accessible by the digital personal assistant, where the VCD file identifies tasks that can be launched headlessly. The definition can specify that the task of the application is always to be launched headlessly, or the definition can specify that the task of the application is to be launched headlessly under particular circumstances. For example, an application might choose to do something headlessly if the user is asking for the task to be performed on a device that does not have a display surface (such as a wireless fitness band), or when the user is operating in a hands-free mode (such as when the user is connected to a Bluetooth headset).

The applications can provide a response on progress, failure, and successful completion of the requested task and output related to the states can be provided by the user interface of the digital personal assistant. The applications can provide many different types of data back to the digital personal assistant including display text, text that can be read aloud, a deep link back to the application, a link to a webpage or website, and HyperText Markup Language (HTML) based web content, for example. The data from the application to the assistant can be presented as if coming from a native function of the assistant via the user interface of the assistant.

If the user provides a request to the application that can have multiple meanings or results, the application can provide the digital personal assistant with a list of choices and the user interface of the assistant can be used to disambiguate between the choices. If the user provides a request to the application that can be destructive or is important (such as when the user requests that a banking application perform a balance transfer), a confirmation interface of the assistant can be used to confirm the request prior to completing the destructive or important task.

Applications can be speculatively loaded or warmed up as the commands are being spoken. For example, when the user completes the phrase "Movie-Application" from the command, "Movie-Application, add Movie-X to my queue," memory can be allocated, and various subroutines of an installed movie application can be retrieved from storage and loaded into the allocated memory in preparation for using the subroutines when the command is complete. When the application is a web service, warming up can include establishing a communication session and retrieving user-specific information from a database at a remote server, for example. By warming up the application, the time to respond to the user can potentially be decreased so that the interaction is more natural and so that the user can move to the next task quicker, making the user more productive.

Using the technologies herein, the user desiring to add a movie to the user's queue with a movie application can have a different experience than when using the typical solution of launching the movie application and passing control to the application. In this example, the add-movie-to-queue command of the Movie-Application can be defined as headless in a command data structure, such as a VCD file. When the user says "Movie-Application" from the command, "Movie-Application, add Movie-X to my queue," the movie application can be warmed up so that the response time to the user can be reduced. When the command is complete, the movie can be added to the user's queue using the movie application, but without surfacing the user interface of the movie application. The movie can be added to the user's queue and the digital personal assistant can confirm (using the assistant's user interface) that the movie was added. The user can experience a quicker response time and can perform fewer steps to complete the task (e.g., the movie application does not need to be closed).

Example System Including a Digital Personal Assistant

FIG. 1 is a system diagram depicting an example of a system 100 for headlessly completing a task 112 of a voice-enabled application 110 in the background of a digital personal assistant 120. The voice-enabled application 110 and the digital personal assistant 120 can be software modules installed on a computing device 130. The computing device 130 can be a desktop computer, a laptop, a mobile phone, a smart phone, a wearable device (such as a watch or wireless electronic band), or a tablet computer, for example. The computing device 130 can include a command data structure 140 for identifying applications and tasks of applications that can be launched by the digital personal assistant 120. The applications can be launched by the digital personal assistant 120 in the foreground (such as where a user interface of the application appears when the application is launched) and/or in the background (such as where the user interface of the application does not appear when the application is launched). For example, some tasks of an application can be launched in the foreground and different tasks of the same application can be launched in the background. The command data structure 140 can define how the application and/or tasks of the application should be launched from the digital personal assistant 120.

The computing device 130 can include a microphone 150 for converting sound to an electrical signal. The microphone 150 can be a dynamic, condenser, or piezoelectric microphone using electromagnetic induction, a change in capacitance, or piezoelectricity, respectively, to produce the electrical signal from air pressure variations. The microphone 150 can include an amplifier, one or more analog or digital filters, and/or an analog-to-digital converter to produce a digital sound input. The digital sound input can comprise a reproduction of the user's voice, such as when the user is commanding the digital personal assistant 120 to accomplish a task. The computing device 130 can include a touch screen or keyboard (not shown) for enabling the user to enter textual input.

The digital sound input and/or the textual input can be processed by a natural language processing module 122 of the digital personal assistant 120. For example, the natural language processing module 122 can receive the digital sound input and translate words spoken by a user into text. The extracted text can be semantically analyzed to determine a user voice command. By analyzing the digital sound input and taking actions in response to spoken commands, the digital personal assistant 120 can be voice-controlled. For example, the digital personal assistant 120 can compare extracted text to a list of potential user commands to determine the command mostly likely to match the user's intent. The match can be based on statistical or probabilistic methods, decision-trees or other rules, other suitable matching criteria, or combinations thereof. The potential user commands can be native commands of the digital personal assistant 120 and/or commands defined in the command data structure 140. Thus, by defining commands in the command data structure 140, the range of tasks that can be performed on behalf of the user by the digital personal assistant 120 can be extended. The potential commands can include performing the task 112 of the voice-enabled application 110, which can be defined to be a headless or background task in the command data structure 140.

The natural language processing module 122 can generate a stream of text as the speech is processed so that intermediate strings of text can be analyzed before a user utterance is complete. Thus, if the user begins a command with a name of an application, the application can be identified early in the utterance, and the application can be warmed up prior to the user completing the command. Warming up the application can include retrieving instructions of the application from relatively slower non-volatile memory (such as a hard-disk drive or Flash memory) and storing the instructions in relatively faster volatile memory (such as main memory or cache memory).

When the digital personal assistant 120 determines that a command is associated with a task of an application, the task of the application can be executed. If the digital personal assistant 120 determines that the task of the application is to be executed as a background process (such as by analyzing the definition in the command data structure 140), the application can execute in the background. The application, such as the voice-enabled application 110, can communicate with the digital personal assistant 120. For example, the application can sequence through a set of states associated with completion of the task, and the state of the application can be communicated to the digital personal assistant 120. For example, the application can begin in an "initial" state, transition to a "progress" state while the task is being performed, and then transition to a "final" state when the task is complete.

The digital personal assistant 120 can report on the progress of the task via a user interface 124. The user interface 124 can communicate information to the user in various ways, such as by presenting text, graphics or hyperlinks on a display of the computing device 130, generating audio outputs from a speaker of the computing device 130, or generating other sensory outputs such as vibrations from an electric motor connected to an off-center weight of the computing device 130. For example, the user interface 124 can cause a spinning wheel to be presented on a display screen of the computing device 130 when the task is in the progress state. As another example, the user interface 124 can generate simulated speech indicating successful completion of the task when the task is in the final state and the task was successfully completed. By using the user interface 124 of the digital personal assistant 120 to report on the status of the task, the response can come from within a context of the user interface 124 without surfacing a user interface of the application.

It should be noted that the voice-enabled application 110 can be created by the producer of the digital personal assistant 120 or by a third-party that is different from the producer. Interoperation of the digital personal assistant 120 and the voice-enabled application 110 can be achieved by complying with an application-to-application software contract and by defining functionality in the command data structure 140. The voice-enabled application 110 can be capable of operating as a stand-alone application or only as a component of the digital personal assistant 120. As a stand-alone application, the voice-enabled application 110 can be launched outside of the digital personal assistant 120 as a foreground process, such as by tapping or double clicking on an icon associated with the voice-enabled application 110 and displayed on a display screen of the computing device 130. The voice-enabled application 110 can present a user interface when it is launched and the user can interact with the user interface to perform tasks. The interaction can be only with voice input, or other modes of input can also be used, such as text input or gesturing. Applications called by the digital personal assistant 120 can be installed on the computing device 130 or can be web services.

The digital personal assistant 120 can call web services, such as the web service 162 executing on the remote server computer 160. Web services are software functions provided at a network address over a network, such as a network 170. The network 170 can include a local area network (LAN), a Wide Area Network (WAN), the Internet, an intranet, a wired network, a wireless network, a cellular network, combinations thereof, or any network suitable for providing a channel for communication between the computing device 130 and the remote server computer 160. It should be appreciated that the network topology illustrated in FIG. 1 has been simplified and that multiple networks and networking devices can be utilized to interconnect the various computing systems disclosed herein. The web service 162 can be called as part of the kernel or main part of the digital personal assistant 120. For example, the web service 162 can be called as a subroutine of the natural language processing module 122. Additionally or alternatively, the web service 162 can be an application defined in the command data structure 140 and can be capable of being headlessly launched from the digital personal assistant 120.

Example Software Architecture Including a Digital Personal Assistant

Figure 2:
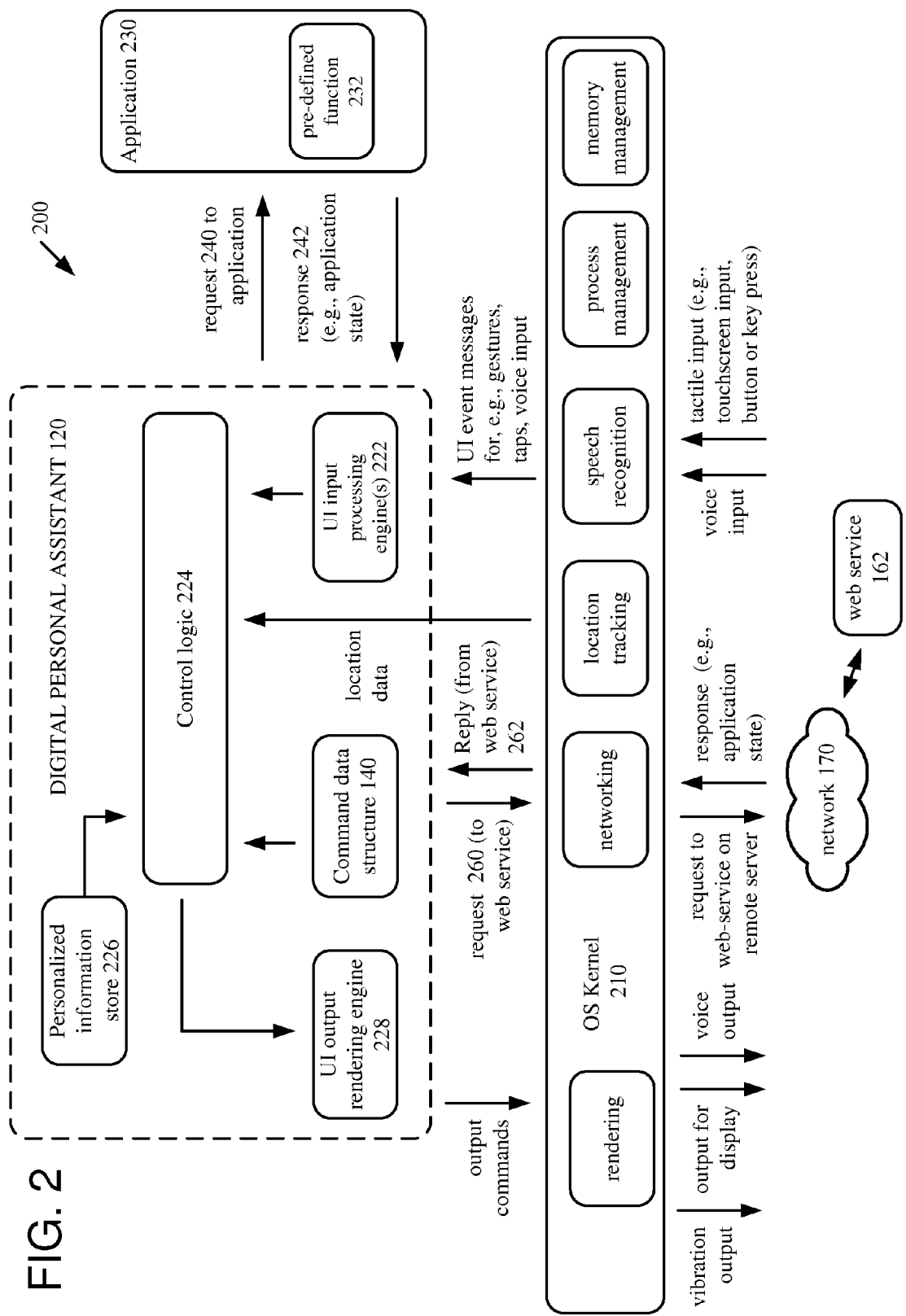
FIG. 2 is a diagram depicting an example software architecture for headlessly completing a task of an application in the background of a digital personal assistant.

FIG. 2 is a diagram depicting an example software architecture 200 for headlessly completing a task of an application in the background of a digital personal assistant 120. When performing a task of an application headlessly, the task can be executed in the background and a user interface of the application does not surface as a result of the task being performed. Rather, the user interface of the digital personal assistant 120 can be used to provide output to and/or input from the user so that the user interacts within the context of the digital personal assistant 120 and not the context of the application. Thus, a headlessly executed task of an application can execute in the background for the duration of execution of the task, and the user interface of the application never surfaces. A computing device, such as computing device 130, can execute software for a digital personal assistant 120, an operating system (OS) kernel 210, and an application 230 organized according to the architecture 200.

The OS kernel 210 generally provides an interface between the software components and the hardware components of computing device 130. The OS kernel 210 can include components for rendering (e.g., rendering visual output to a display, generating voice output and other sounds for a speaker, and generating a vibrating output for an electric motor), components for networking, components for process management, components for memory management, components for location tracking, and components for speech recognition and other input processing. The OS kernel 210 can manage user input functions, output functions, storage access functions, network communication functions, memory management functions, process management functions, and other functions for the computing device 130. The OS kernel 210 can provide access to such functions to the digital personal assistant 120 and the application 230, such as through various system calls.

A user can generate user input (such as voice, tactile, and motion) to interact with the digital personal assistant 120. The digital personal assistant 120 can be made aware of the user input via the OS kernel 210 which can include functionality for creating messages in response to user input. The messages can be used by the digital personal assistant 120 or other software. The user input can include tactile input such as touchscreen input, button presses, or key presses. The OS kernel 210 can include functionality for recognizing taps, finger gestures, etc. to a touchscreen from tactile input, button input, or key press input. The OS kernel 210 can receive input from the microphone 150 and can include functionality for recognizing spoken commands and/or words from voice input. The OS kernel 210 can receive input from an accelerometer and can include functionality for recognizing orientation or motion such as shaking.

The user interface (UI) input processing engine 222 of the digital personal assistant 120 can wait for user input event messages from the OS kernel 210. The UI event messages can indicate a recognized word from voice input, a panning gesture, flicking gesture, dragging gesture, or other gesture on a touchscreen of the device, a tap on the touchscreen, keystroke input, a shaking gesture, or other UI event (e.g., directional buttons or trackball input). The UI input processing engine 222 can translate the UI event messages from the OS kernel 210 into information sent to control logic 224 of the digital personal assistant 120. For example, the UI input processing engine 222 can include natural language processing capabilities and can indicate that a particular application name has been spoken or typed or that a voice command has been given by the user. Alternatively, the natural language processing capabilities can be included in the control logic 224.

The control logic 224 can receive information from various modules of the digital personal assistant 120, such as the UI input processing engine 222, a personalized information store 226, and the command data structure 140, and the control logic 224 can make decisions and perform operations based on the received information. For example, the control logic 224 can determine if the digital personal assistant 120 should perform a task on behalf of the user, such as by parsing a stream of spoken text to determine if a voice command has been given.

The control logic 224 can wait for the entire user command to be spoken before acting on the command, or the control logic 224 can begin acting on the command as it is still being spoken and before it is completed. For example, the control logic 224 can analyze intermediate strings of the spoken command and attempt to match the strings to one or more applications defined in the command data structure 140. When the probability that an application will be called exceeds a threshold, the application can be warmed up so that the application can respond to the user more promptly. Multiple applications and/or functions can be speculatively warmed up in anticipation of being called, and the applications can be halted if it is determined that the application will not be called. For example, when the user begins the spoken command with the name of a particular application, there is a high probability that the particular application will be called, and so that application can be warmed up. As another example, some partial command strings can be limited to a small set of applications defined in the command data structure 140, and the set of applications can be warmed up in parallel when there is a match on the partial command string. Specifically, the command data structure 140 may have only two applications with commands having the word "take," such as a camera application with a command "take a picture," and a memo application with a command "take a memo." The control logic 224 can begin warming up both the camera application and the memo application when the word "take" is recognized and then the memo application can be halted when the full command "take a picture" is recognized. Warming up the application can include allocating memory, pre-fetching instructions, establishing a communication session, retrieving information from a database, starting a new execution thread, raising an interrupt, or other suitable application-specific operations. Services of the OS kernel 210 may be called during warm-up, such as the process management service, the memory management service, and the network service, for example.

The spoken text may include contextual information and the control logic 224 can resolve the contextual information so that the user voice command is context-free. Contextual information can include a current location, a current time, an orientation of the computing device 130, and personal information stored in the personalized information store 226. The personal information can include: user-relationships such as a user's, spouse's, or child's name; user-specific locations such as home, work, school, daycare, or doctor addresses; information from the user's contact-list or calendar; the user's favorite color, restaurant, or method of transportation; important birthdays, anniversaries, or other dates; and other user-specific information. The user can give a command with contextual information and the control logic 224 can translate the command into a context-free command. For example, the user can give the command, "Bus-app, tell me the busses home within the next hour." In this example, the contextual information in the command is the current date and time, the current location, and the location of the user's home.

The control logic 224 can get current the current time from the OS kernel 210 which can maintain or have access to a real-time clock. The control logic 224 can get current location data for the computing device 130 from the OS kernel 210, which can get the current location data from a local component of the computing device 130. For example, the location data can be determined based upon data from a global positioning system (GPS), by triangulation between towers of a cellular network, by reference to physical locations of Wi-Fi routers in the vicinity, or by another mechanism. The control logic 224 can get the location of the user's home from the personalized information store 226. The personalized information store 226 can be stored in auxiliary or other non-volatile storage of the computing device 130. Thus, the control logic 224 can receive the personalized information via the OS kernel 210 which can access the storage resource (e.g., the personalized information store 226). When the contextual information can be resolved, the command can be translated to a context-free command. For example, if it is Friday at 6:00 p.m., the user is at 444 Main Street, and the user's home is 123 Pleasant Drive, then the context-free command can be "Bus-app, tell me the busses arriving near 444 Main Street and passing near 123 Pleasant Drive between 6:00 and 7:00 p.m. on Fridays."

The user command can be performed by the control logic 224 (such as when the command is a native command of the digital personal assistant 120), an application 230 installed on the computing device 130 (such as when the command is associated with the application 230), or the web service 162 (such as when the command is associated with the web service 162). The command data structure 140 can specify which commands are associated with which applications and whether the command can be performed in the foreground or the background. For example, the command data structure 140 can map user voice commands to functions supported by available third-party voice-enabled applications.

The control logic 224 can cause a pre-defined function 232 of the application 230 to be executed when the control logic 224 determines that the user command is associated with the pre-defined function 232 of the application 230. If the control logic 224 determines that pre-defined function 232 of the application 230 is to be executed as a background process, the pre-defined function 232 can execute in the background. For example, the control logic 224 can send a request 240 to the pre-defined function 232 by raising an interrupt, writing to shared memory, writing to a message queue, passing a message, or starting a new execution thread (such as via the process management component of the OS kernel 210). The application 230 can perform the pre-defined function 232 and return a response 242 to the control logic 224 by raising an interrupt, writing to shared memory, writing to a message queue, or passing a message. The response can include a state of the application 230 and/or other information responsive to the user command.

The control logic 224 can cause the web service 162 to be called when the control logic 224 determines that the command is associated with the web service 162. For example, a request 260 can be sent to the web service 162 through the networking component of the OS kernel 210. The networking component can format and forward the request over the network 170 (such as by encapsulating the request in a network packet according to a protocol of the network 170) to the web service 162 to perform the user command. The request 260 can include multiple steps such as opening a communication channel (e.g., a socket) between the control logic 224 and the web service 162, and sending information related to the user command. The web service 162 can respond to the request 260 with a response that can be transmitted through the network 170 and forwarded by the networking component to the control logic 224 as reply 262. The response from the web service 162 can include a state of the web service 162 and other information responsive to the user command.

The control logic 224 can generate an output (with the aid of a UI output rendering engine 228 and the rendering component of the OS kernel 210) to be presented to the user based on responses from the applications. For example, the command data structure 140 can map states received from the functions to responses provided to the user from the voice-controlled digital personal assistant 120. In general, the control logic 224 can provide high-level output commands to the UI output rendering engine 228 which can produce lower-level output primitives to the rendering component of the OS kernel 210 for visual output on a display, audio and/or voice output over a speaker or headphones, and vibrating output from an electric motor. For example, the control logic 224 can send a text-to-speech command with a string of text to the UI output rendering engine 228 which can generate digital audio data simulating a spoken voice.

The control logic 224 can determine what information to provide to the user based on a state of the application. The states can correspond to beginning, processing, confirming, disambiguating, or finishing a user command. The command data structure 140 can map the states of the application to different responses to be provided to the users. The types of information that can be provided include display text, simulated speech, a deep link back to the application, a link to a webpage or website, and HyperText Markup Language (HTML) based web content, for example.

Example Application States

Figure 3:
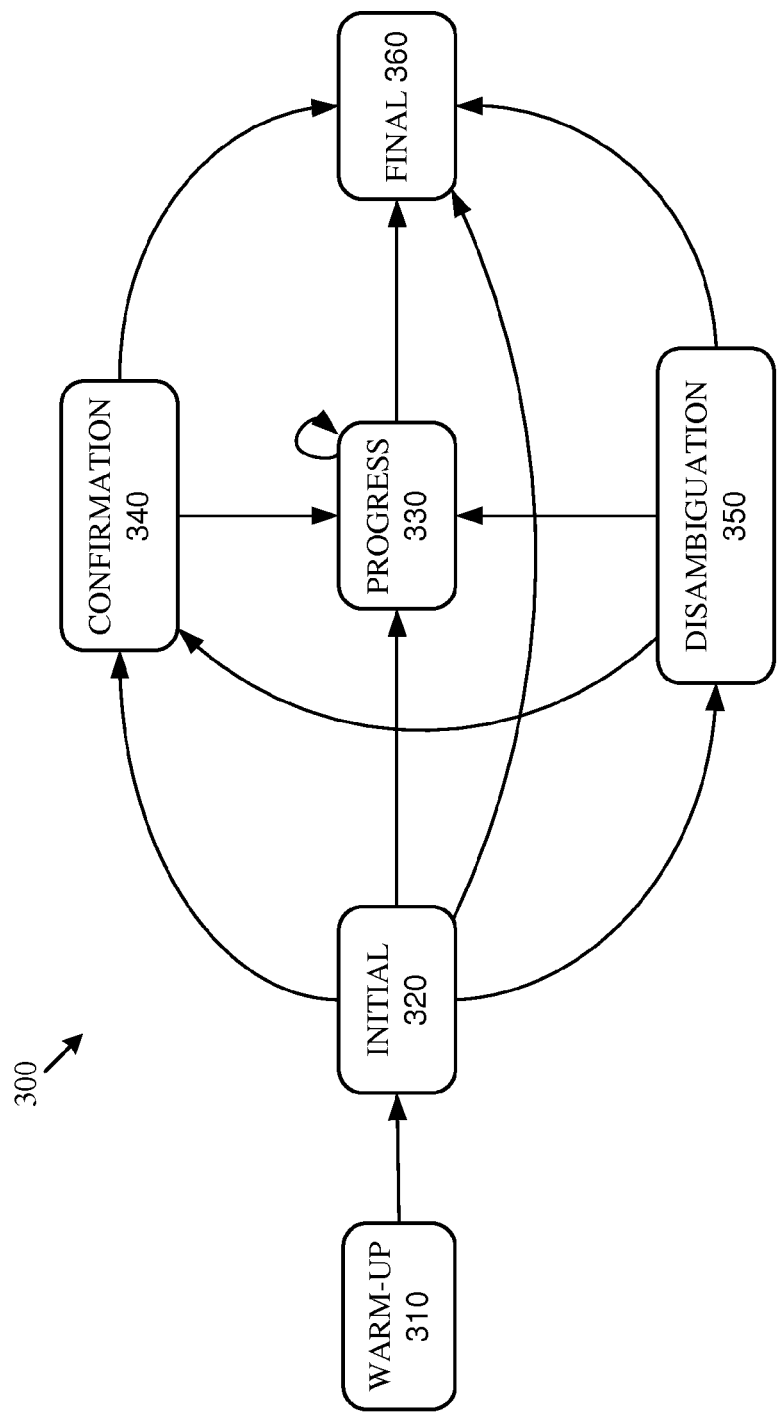
FIG. 3 is a diagram of an example state machine for an application interfacing with a digital personal assistant.

FIG. 3 is a diagram of an example state machine 300 for an application interfacing with the digital personal assistant 120 in a headless manner. The application can begin in either a warm-up state 310 or an initial state 320. The warm-up state 310 can be entered when the digital personal assistant 120 causes the application to warm-up, such as when the application name is known, but the spoken command is not complete. The application will remain in the warm-up state 310 until the warm-up operations are complete. When the warm-up operations are complete, the application can transition to the initial state 320.

The initial state 320 can be entered after the warm-up state 310 is completed or after the user command is provided by the digital personal assistant 120 to the application. During the initial state 320, the user command is processed by the application. If the command is unambiguous but will take more than a pre-determined amount of time to complete (such as five seconds), the state can be transitioned to a progress state 330 while the command is being performed. If the command is unambiguous and may result in an important or destructive operation being performed, the state can be transitioned to a confirmation state 340. If the command is somewhat ambiguous, but the ambiguity can be clarified by choosing between a few options, the state can be transitioned to a disambiguation state 350. If the command is ambiguous and cannot be disambiguated with a few options, the state can be transitioned to a final state 360, such as a failure state or a redirection state. If the command cannot be performed, the state can be transitioned to a final state 360, such as the failure state. If the command can be completed in less than a pre-determined amount of time to complete and it is not desired to request confirmation from the user, the state can be transitioned to a final state 360, such as a success state. It should be noted that the final state 360 can be a single state with multiple conditions (such as where the conditions are success, failure, redirection, and time-out) or a group of final states (such as where the states are success, failure, redirection, and time-out).

The progress state 330 can indicate that operations of the user command are being performed or are being attempted. The application can provide information to the user during the progress state 330 by sending a text-to-speech (TTS) string or a graphical user interface (GUI) string to the digital personal assistant 120 so that the information can be presented to the user using the user interface of the digital personal assistant 120. Additionally or alternatively, default information (such as a spinning wheel, an hourglass, and/or a cancel button) can be presented to the user during the progress state 330 using the user interface of the digital personal assistant 120.

During the progress state 330, the application can monitor the progress of the operations and determine whether the application can stay in the progress state 330 or transition to the final state 360. In one embodiment, the application can start a timer (such as for five seconds) and if the application does not make sufficient progress before the timer expires, the state can be transitioned to the final state 360, such as a time-out state. If the application is making sufficient progress, the timer can be restarted and the progress can be examined again at the next timer expiration. The application can have a maximum time limit to stay in the progress state 330, and if the maximum time limit is exceeded, the state can be transitioned to the final state 360, such as the time-out state. The operations associated with the user command can complete (either successfully or unsuccessfully) and the state can be transitioned to the appropriate final state 360. The user can terminate the application when it is in the progress state 330 by giving a command to the user interface of the digital personal assistant 120. For example, the user can press or click a "cancel" or "back" button on a display or say "cancel." Cancelling the command can cause the digital personal assistant 120 to stop the application, and display a home screen of the digital personal assistant 120 or to exit.

The confirmation state 340 can indicate that the application is waiting for confirmation from the user before completing a task. When the digital personal assistant 120 detects that the application is in the confirmation state 340, a prompt for a yes/no response can be presented to the user using the user interface of the digital personal assistant 120. The application can provide the digital personal assistant 120 with a TTS string which is a question having an answer of yes or no. The digital personal assistant 120 can speak the application's provided TTS string and can listen for a "Yes\No" answer. If the user response does not resolve to a yes or no answer, the digital personal assistant 120 can continue to ask the user the question up to a predefined number of times (such as three times). If all of the attempts have been exhausted, the digital personal assistant 120 can say a default phrase, such as "I'm sorry, I don't understand. Tap below to choose an answer" and the digital personal assistant 120 can stop listening. If the user taps yes or no, the digital personal assistant 120 can send the user's choice to the application. If the user taps a microphone icon, the digital personal assistant 120 can again attempt to recognize a spoken answer (such as by resetting a counter that counts the number of attempts to answer verbally). The digital personal assistant 120 can loop until there is a match or the user cancels or hits the back button on the display screen. If the application receives an affirmative response from the digital personal assistant 120, the application can attempt to complete the task. If the task completes successfully, the state can transition to the final state 360 with a condition of success. If the task fails to complete successfully or the application is cancelled, the state can transition to the final state 360 with a condition of failure. If the task will take more than a pre-determined amount of time to complete, the state can be transitioned to the progress state 330 while the task is being performed.

The disambiguation state 350 can indicate that the application is waiting for the user to clarify between a limited number (such as ten or less) of options before completing a task. The application can provide the digital personal assistant 120 with a TTS string, a GUI string, and/or a list of items that the user is choose from. The list of items can be provided as a template with one or more pieces of information to provide to the user for each item, such as a title, a description, and/or an icon. The digital personal assistant 120 can present the list of items to the user using the information provided by the application. The digital personal assistant 120 can prompt and listen for a selection from the user. The user can select from the list using flexible or non-flexible selection. Non-flexible selection means that the user can only select from the list in one way whereas flexible selection means that the user can select from the list in multiple different ways. For example, the user can select from the list based on the numerical order in which the items are listed, such as by saying "first" or "second" to select the first item or the second item, respectively. As another example, the user can select from the list based on spatial relationships between the items such as "the bottom one," "the top one," "the one on the right," or "the second from the bottom." As another example, the user can select from the list by saying the title of the item.

As a specific example of disambiguation, the user can say to the digital personal assistant 120, "Movie-Application, add Movie-X to my queue." However, there may be three versions of Movie-X, such as the original and two sequels: Movie-X I, Movie-X II, and Movie-X III. In response to the spoken command, the digital personal assistant 120 can launch the Movie-Application in the background with the command to add Movie-X to the queue. The Movie-Application can search for Movie-X and determine that there are three versions. Thus, Movie-Application can transition to the disambiguation state 350 and send the three alternative choices to the digital personal assistant 120. The digital personal assistant 120, through its user interface, can present the user with the three choices and the user can select one from the list. When a proper selection is made by the user, the digital personal assistant 120 can send the response to the Movie-Application and the correct movie can be added to the queue.

If the user response cannot be resolved to an item on the list, the digital personal assistant 120 can continue to ask the user the question up to a predefined number of times. If all of the attempts have been exhausted, the digital personal assistant 120 can say a default phrase, such as "I'm sorry, I don't understand. Tap below to choose an answer" and the digital personal assistant 120 can stop listening. If the user taps one of the items on the displayed list, the digital personal assistant 120 can send the user's choice to the application. If the user taps a microphone icon, the digital personal assistant 120 can again attempt to recognize a spoken answer (such as by resetting a counter that counts the number of attempts to answer verbally). The digital personal assistant 120 can loop until there is a match or the user cancels or hits the back button on the display screen. If the application receives a valid response from the digital personal assistant 120, the application can attempt to complete the task. If the task needs user confirmation before taking action, the state can transition to the confirmation state 340. If the task completes successfully, the state can transition to the final state 360 with a condition of success. If the task fails to complete successfully or the application is cancelled, the state can transition to the final state 360 with a condition of failure. If the task will take more than a pre-determined amount of time to complete, the state can be transitioned to the progress state 330 while the task is being performed.

It should be understood that the example state machine 300 can be extended with additional or alternative states to enable various multi-turn conversations between the user and an application. Disambiguation (via the disambiguation state 350) and confirmation (via the confirmation state 340) are specific examples of a multi-turn conversation. Generally, in a multi-turn conversation, a headless application can request additional information from the user without surfacing its user interface. Rather, the information can be obtained from the user by the digital personal assistant 120 on behalf of the application. Thus, the digital personal assistant 120 can act as a conduit between the user and the application.

The final state 360 can indicate that the application has successfully completed the task, has failed to complete the task, has timed-out, or is suggesting that the application should be launched in the foreground (redirection). As described above, the final state 360 can be a single state with multiple conditions (e.g., success, failure, redirection, and time-out) or a group of final states (e.g., success, failure, redirection, and time-out). The application can provide the digital personal assistant 120 with a TTS string, a GUI string, a list of items (provided via a template), and/or a launch parameter. The digital personal assistant 120 can present the information provided by the application to the user using the user interface of the digital personal assistant 120. Additionally or alternatively, the digital personal assistant 120 can present pre-defined or canned responses associated with the different conditions. For example, if a time-out occurs or the task fails, the digital personal assistant 120 can say "Sorry! I couldn't get that done for you. Can you please try again later?" As another example, if the application is requesting redirection, the digital personal assistant 120 can say "Sorry. <appName> is not responding. Launching <appName>" and the digital personal assistant 120 can attempt to launch the application in the foreground with the original voice command and the launch parameter (if a launch parameter is provided by the application). As another example, if the application completes the task successfully, the digital personal assistant 120 can say "I've done that for you."

Example Command Definition

FIG. 4 is an example of a command definition 400 conforming to a schema that can be used to create a data structure, such as the command data structure 140, for enabling an interface between a third-party application and the digital personal assistant 120. The command definition 400 can be written in various languages, such as Extensible Markup Language (XML) or a subset of XML that is defined by a schema. For example, the schema can define the structure of the command definition, such as the legal elements, the hierarchy of elements, the legal and optional attributes for each element, and other suitable criteria. The command definition 400 can be used by the digital personal assistant 120 to assist with parsing a user utterance into different components such as an application, a command or task, and a data item or slot, where the data item is optional. For example, the command "MovieAppService, add MovieX to my queue" can be parsed into an application ("MovieAppService"), a command ("Add"), and a data item ("MovieX"). The command definition 400 can include elements for defining an application name, tasks or commands of the application, alternative phrasing for natural language processing, and responses associated with different application states.

One or more applications can be defined in the command definition 400. The applications can be third party or other applications that are installed on the computing device or web services. Information related to the application can be demarcated with an element defining the application. For example, the application name can be defined by an <AppName> element and the elements between the <AppName> elements can be associated with the leading <AppName> element. In the command definition 400, the application name is "MovieAppService," and the elements that follow the <AppName> element are associated with the "MovieAppService" application.

Commands following the application name are the commands of the application. The commands can be identified with a <Command> element. Attributes of the command element can include a name (e.g., "Name") of the command and an activation type (e.g., "ActivationType") of the command. For example, the activation type can be "foreground" for commands that are to be launched in the foreground and the activation type can be "background" for commands that are to be launched in the background. The "ActivationType" attribute can be optional, with a default activation type being foreground.

The <ListenFor> element can be nested within the <Command> element and can be used to define one or more ways in which the command can be spoken. Optional or carrier words can be provided as hints to the digital personal assistant 120 when performing natural language processing. Carrier words can be identified within square brackets: [ ]. Data items can be identified within curly brackets or braces: { }. In the command definition 400, there are generally two alternative ways to call the "Add" command as defined by the two <ListenFor> elements. For example, saying either "add MovieX to my queue" or "add MovieX to my MovieAppService queue" can be used to have the digital personal assistant 120 launch the "Add" command of the MovieAppService in the background. It should be noted that predefined phrases can be identified with the keyword "builtIn:" within a set of braces: {builtIn:<phrase identifier>}.

The <Feedback> element can be nested within the <Command> element and can be used to define a phrase to be spoken to the user when the digital personal assistant 120 has successfully recognized a spoken command from the user. Additionally or alternatively, the <Feedback> element can define a text string to be displayed to the user as the spoken command is being parsed by the digital personal assistant 120.

The <Response> element can be nested within the <Command> element and can be used to define one or more responses provided by the digital personal assistant 120 to the user. Each response is associated with a state of the application as defined by a "State" attribute. The states can be for final states, such as success and failure, or for intermediate states, such as progress. There can be multiple types of responses defined, such as <DisplayString> for displaying text on a screen, <TTSString> for text that will be spoken to the user, <AppDeepLink> for a deep link to a web-site, and <WebLink> for a less deep link to a web-site, for example. The responses defined by the <Response> element can be augmented with additional response information provided by the application.

Example Sequence Diagram

Figure 5:
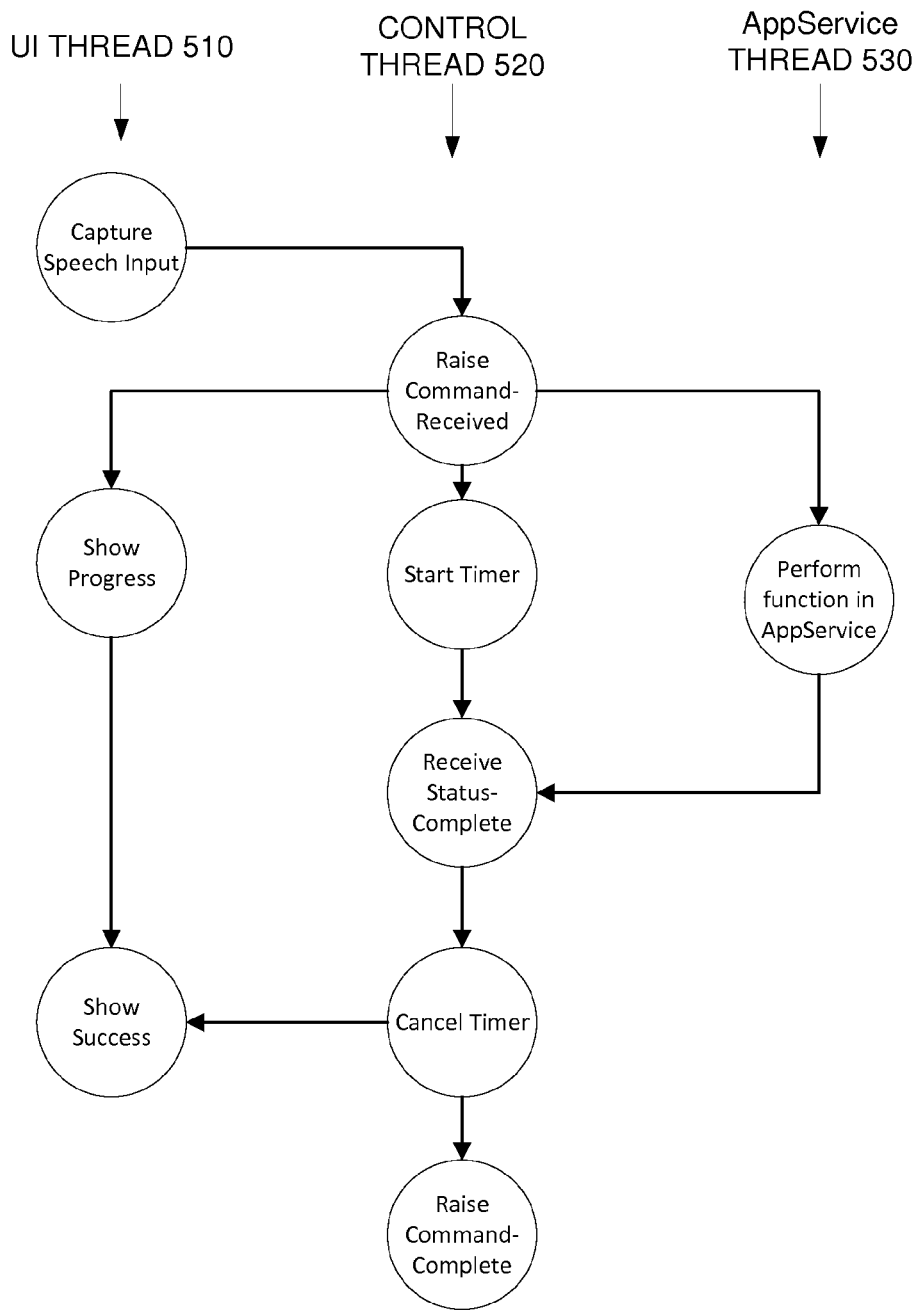
FIG. 5 is an example sequence diagram illustrating the communication of multiple threads to headlessly perform a task of an application from within a digital personal assistant.

FIG. 5 is an example sequence diagram 500 illustrating the communication of multiple execution threads (510, 520, and 530) to headlessly perform a function of a third party application from within the digital personal assistant 120. The UI thread 510 and the control thread 520 can be parallel threads of a multi-threaded embodiment of the digital personal assistant 120. The UI thread 510 can be primarily responsible for capturing input from and displaying output to the user interface of the digital personal assistant 120. For example, speech input, tactile input, and/or text input can be captured by the UI thread 510. In one embodiment, the UI thread 510 can perform natural language processing on the input and can match the user's spoken commands to commands in the command data structure 140. When the spoken command is determined to match a command in the command data structure 140, the command can be communicated to the control thread 520 for further processing. In an alternative embodiment, the UI thread 510 can capture speech to text input, and individual words can be communicated to the control thread 520 which can perform natural language processing on the input and can match the user's spoken commands to commands in the command data structure 140.

The control thread 520 can be primarily responsible for communicating with and tracking progress of the application and interfacing with the UI thread 510. For example, the control thread 520 can be notified by the UI thread 510 that the user has spoken to the user interface of the digital personal assistant 120. Words or commands can be received by the control thread 520 and the control thread 520 can notify the UI thread 510 when a user command has been recognized by the control thread 520. The UI thread 510 can indicate to the user, via the user interface of the digital personal assistant 120, that progress is being made on the command. The UI thread 510 or the control thread 520 can determine that the command is to be launched headlessly, by retrieving attributes of the command from the command data structure 140. The control thread 520 can start a new thread or communicate with an existing thread, such as the AppService thread 530, when the command is to be launched headlessly. To reduce response time to the user, it may be desirable for the AppService thread 530 to be an existing thread, rather than having the control thread 520 start a new thread. For example, the AppService thread 530 can be started when warming up the application or during a boot-up of the computing device 130.

The AppService thread 530 can be executed on the computing device 130 or can be executed on a remote server, such as the remote server computer 160. The AppService thread 530 can be primarily responsible for completing the function specified by the user command. The AppService thread 530 can maintain a state machine (such as the state machine 300) to track the execution progress of the function, and can provide updates on the status to the control thread 520. By providing status updates to the control thread 520, the AppService thread 530 can be headless, where output to the user is provided by the digital personal assistant 120 and not a user interface of the AppService thread 530.

The control thread 520 can track the progress of the application (e.g., AppService thread 530) by receiving status updates from the application and checking whether the application is making headway. For example, the control thread 520 can start a timer of a pre-defined duration (such as five seconds) each time that it communicates with the AppService thread 530 (either sending information to the AppService thread 530 or receiving information from the AppService thread 530). If the timer expires before the AppService thread 530 responds, the control thread 520 can indicate to the UI thread 510 that the application failed to respond and the UI thread 510 can present a failure message to the user via the user interface of the digital personal assistant 120. The AppService thread 530 can be terminated or ignored by the control thread 520 after the timer expires. Alternatively, if the AppService thread 530 responds before the timer expires, the timer can be reset if another response is expected from the application (such as when application responds with the progress state), or the timer can be cancelled (such as when the application has completed the function (a final state) or when a user response is being requested (a confirmation or disambiguation state)).

When the control thread 520 receives a confirmation or disambiguation state from the AppService thread 530, the control thread 520 can indicate to the UI thread 510 that confirmation or disambiguation is requested from the user. The UI thread 510 can present the confirmation or disambiguation choices to the user via the user interface of the digital personal assistant 120. When the user responds, or fails to respond, the UI thread 510 can provide the user response, or definitive lack thereof, to the control thread 520. The control thread 520 can pass the user response to the AppService thread 530 so that the AppService thread 530 can carry out the function. If the user fails to respond, the control thread 520 can terminate the AppService thread 530.

The UI thread 510 can display various types of output via the user interface of the digital personal assistant 120. For example, the UI thread 510 can generate audio output, such as digital simulated speech output from text. The digital simulated speech can be sent to an audio processing chip that can convert the digital simulated speech to an analog signal (such as with a digital-to-analog converter) which can be output as sound via a speaker or headphones. As another example, the UI thread 510 can provide visual output, such as images, animation, text output, and hyperlinks for viewing by the user on a display screen of the computing device 130. If the hyperlinks are tapped or clicked on, the UI thread 510 can start a browser application to view a website corresponding to the selected hyperlink. As another example, the UI thread 510 can generate tactile output, such as by sending a vibrate signal to an electric motor that can cause the computing device 130 to vibrate.

Example Method for Headless Task Completion

Figure 6:
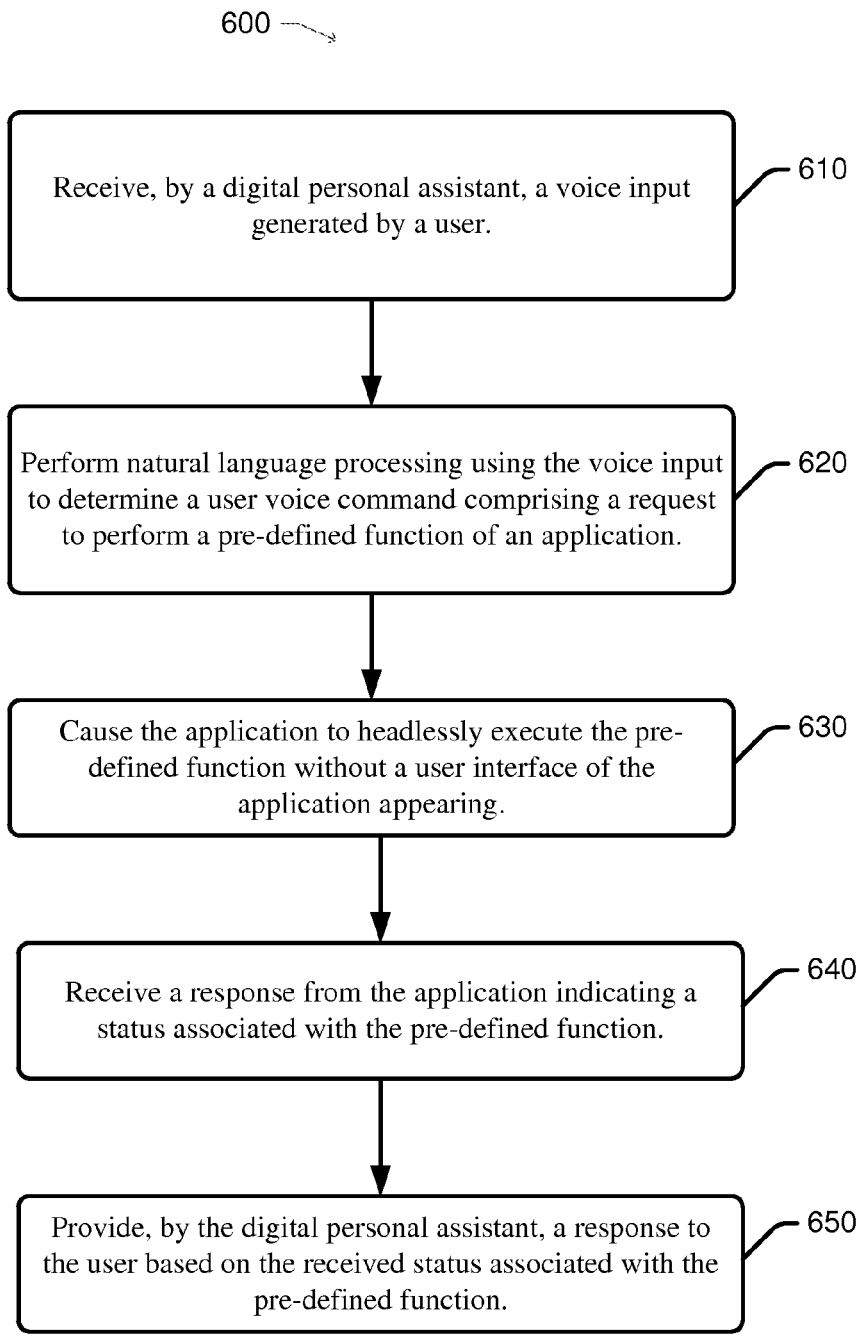
FIG. 6 is a flowchart of an example method for headlessly completing a task of an application in the background of a digital personal assistant.

FIG. 6 is a flowchart of an example method 600 for headlessly completing a task of an application in the background of the digital personal assistant 120. At 610, a voice input, generated by a user, can be received by the digital personal assistant 120. The voice input can be captured locally at the computing device 130 or remotely from the computing device 130. As one example, the voice input generated by the user can be locally captured by a microphone 150 of the computing device 130 and digitized by an analog-to-digital converter. As another example, the voice input generated by the user can be remotely captured by a microphone (such as by a blue-tooth companion device) wirelessly connected to the computing device 130. The digital personal assistant 120 can be controlled by voice and/or text entered at the user interface of the digital personal assistant 120.

At 620, natural language processing of the voice input can be performed to determine a user voice command. The user voice command can include a request to perform a pre-defined function of an application, such as a third-party voice-enabled application. The pre-defined function can be identified using a data structure that defines applications and functions of applications that are supported by the digital personal assistant 120. For example, the compatible applications can be identified in a command definition file, such as the command definition 400. By using an extensible command definition file to define functions of third-party applications that can be headlessly performed by the digital personal assistant 120, the digital personal assistant 120 can enable the user to perform more tasks with the user interface of the digital personal assistant 120.

At 630, the digital personal assistant 120 can cause the application to headlessly execute the pre-defined function without a user interface of the application appearing on a display of the computing device 130. The digital personal assistant 120 can determine to execute the application headlessly because the application is defined as headless in the command data structure 140 or because the user is using the computing device in a hands-free mode and executing the application in the foreground could be potentially distracting to the user. For example, the digital personal assistant 120 can call a web service to execute the pre-defined function of the application. As another example, the digital personal assistant 120 can start a new thread on the computing device 130 to execute the pre-defined function of the application after the user command is determined. As another example, the digital personal assistant 120 can communicate with an existing thread, such as a thread started during a warm-up of the application, to execute the pre-defined function of the application. The pre-defined function can be executed as a background process. The application can monitor the progress of the pre-defined function, such as by tracking a state of the pre-defined function.

At 640, a response can be received from the application indicating a state associated with the pre-defined function. For example, the states can include warm-up, initial, progress, confirmation, disambiguation, and final states. The response can include additional information, such as a templatized list, a text string, a text-to-speech string, an image, a hyperlink, or other suitable information that can be displayed to the user via the user interface of the digital personal assistant 120.

At 650, the user interface of the digital personal assistant 120 can provide a response to the user based on the received state associated with the pre-defined function. In this manner, the response can come from within a context of the user interface of the digital personal assistant 120 without surfacing the user interface of the application. Furthermore, the confirmation and disambiguation capabilities of the digital personal assistant 120 can be used to confirm and/or clarify a user command for the application.

Example Method for Determining Whether to Warm Up an Application

Figure 7:
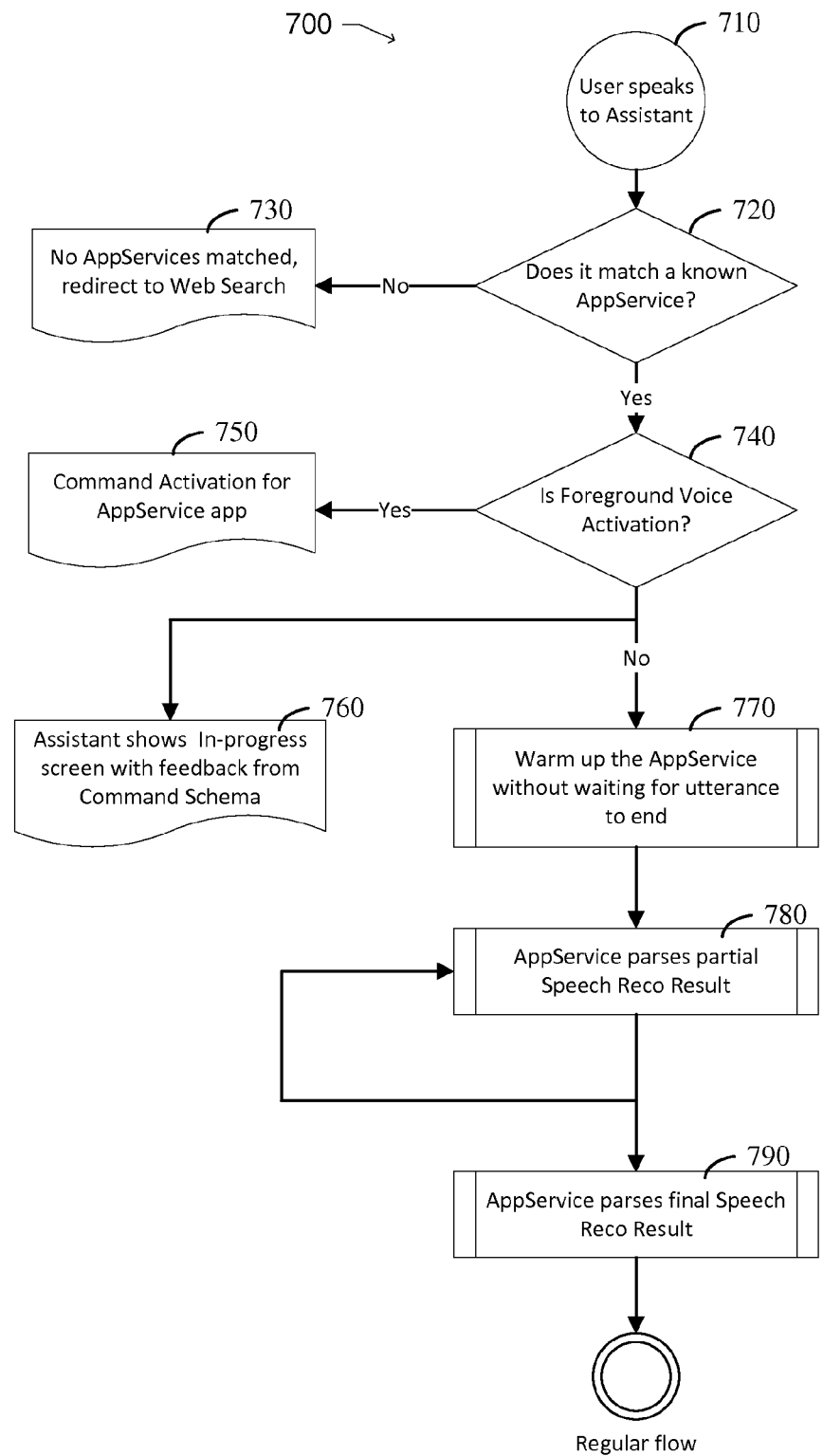
FIG. 7 is a flowchart of an example method for determining whether to warm up an application while a user is speaking to a digital personal assistant.

FIG. 7 is a flowchart of an example method 700 for determining whether to warm up an application while a user is speaking to the digital personal assistant 120. At 710, the user can type, utter, or speak to the digital personal assistant 120. The user's text or speech can be analyzed using natural language processing techniques and individual words can be recognized from the speech. The individual words can be analyzed separately and within the intermediate phrase where they are spoken. For example, the user can say, "hey Assistant, MyApp, do . . . " The word "hey" can be a carrier word and dropped. The word "Assistant" can be used to let the digital personal assistant 120 know that the user is requesting it to perform an action. The word "MyApp" can be interpreted as an application.

At 720, the typed or spoken words can be compared to the native functions of the digital personal assistant 120 and the functions provided in the extensible command definitions. Collectively, the native functions and the functions defined in the command definition file can be referred to as the "known AppServices." The spoken words can be analyzed and compared to the known AppServices as the words are being uttered. In other words, analysis of the speech can occur before the entire phrase is spoken or typed by the user. If none of the known AppServices are matched, then at 730, the digital personal assistant 120 can open a web browser to retrieve a search engine webpage with a search string corresponding to the unrecognized spoken phrase. Program control can be transferred to the web browser so that the user can refine the web search and/or view the results. However, if a known AppService is matched, then the method 700 can continue at 740.

At 740, it can be determined if the AppService application is a foreground or a background task. For example, the command definition can include an attribute that defines the AppService application as a foreground or background application. If the AppService application is a foreground task, at 750, the AppService application can be launched in the foreground and control can be transferred to the AppService application to complete the command. If the AppService application is a background task, then the method 700 can continue with parallel steps 760 and 770.

At 760, the digital personal assistant 120 can provide the user with information regarding the speech analysis. Specifically, the digital personal assistant 120 can generate output for an in-progress screen of the user interface of the digital personal assistant 120. The output can be defined in a <Feedback> element, nested within a <Command> element, of the command definition, for example. The output can be a text string and can be updated continuously as the user continues to speak.

At 770, the digital personal assistant 120 can warm up the AppService application without waiting for the user utterance to end. Warming up the AppService application can include allocating memory, pre-fetching instructions, establishing a communication session, retrieving information from a database, starting a new execution thread, raising an interrupt, or other suitable application-specific operations. The application can be warmed up based on a speculative function. For example, instructions corresponding to the speculative function can be fetched even if the function is not known with certainty. By warming up the application before the user completes the spoken command, the time to respond to the user can potentially be decreased.

At 780, the digital personal assistant 120 can continue to parse the partial speech recognition result until the utterance is complete. The end of the utterance can be detected based on the command being parsed and/or based on a pause from the user for more than a predetermined amount of time. For example, the end of the command, "MovieAppService, add MovieX to my queue" can be detected when the word "queue" is recognized. As another example, the end of the command, "TextApp, text my wife that I will be home late for dinner," can be more difficult to detect because the command ends with a data item of unknown length. Thus, a pause can be used to indicate to the digital personal assistant 120 that the command is complete.

At 790, the end of the spoken command can be detected and the final speech recognition result can be passed to the application. The application and the digital personal assistant 120 can communicate with each other to complete the spoken command as described with reference to earlier Figures.

Computing Systems

Figure 8:
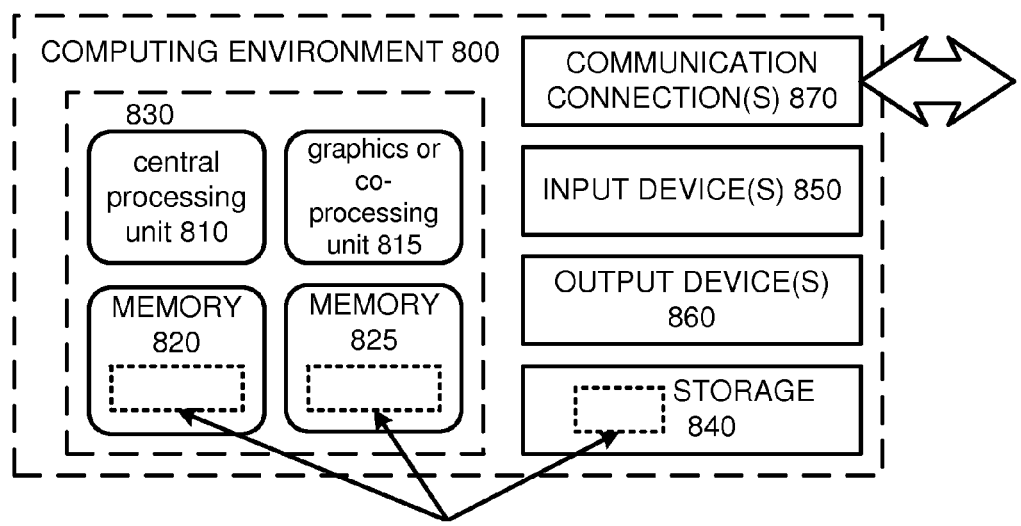
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 9:
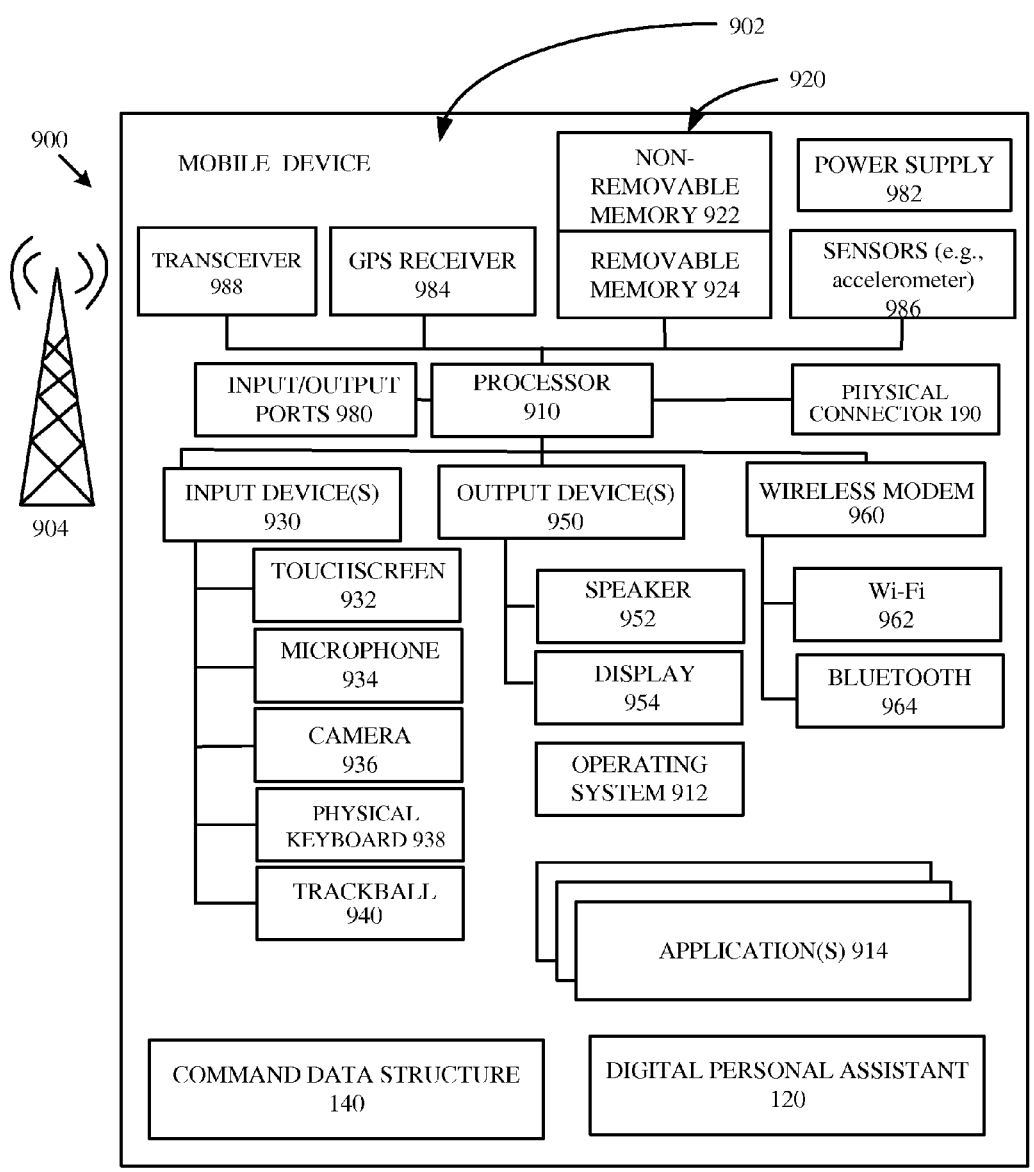
FIG. 9 is an example mobile device that can be used in conjunction with the technologies described herein.

FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for the digital personal assistant 120 and one or more application programs 914. The application programs can include common mobile computing applications (e.g., email applications, calendars, contact managers, web browsers, messaging applications, movie applications, banking applications), or any other computing application. The application programs 914 can include applications having tasks that can be executed headlessly by the digital personal assistant 120. For example, the tasks can be defined in the command data structure 140. Functionality 913 for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394

(FireWire) port, and/or RS-232 port. The illustrated components 902 are not required or all-inclusive, as any components can be deleted and other components can be added.

Cloud-Supported Environment

Figure 10:
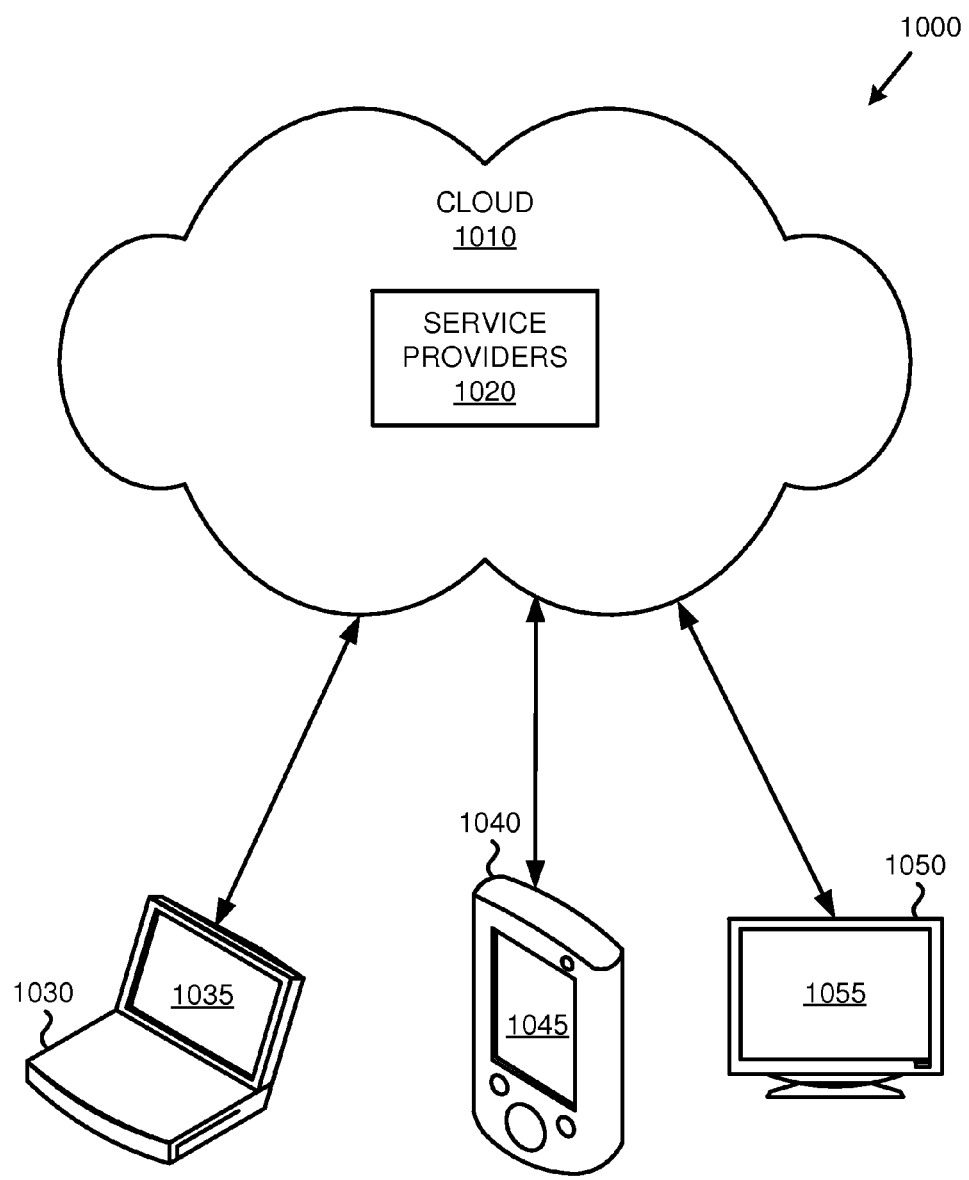
FIG. 10 is an example cloud-support environment that can be used in conjunction with the technologies described herein.

FIG. 10 illustrates a generalized example of a suitable cloud-supported environment 1000 in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050) while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. By way of example and with reference to FIG. 9, computer-readable storage media include memory and storage 920, 922, and 924. The term computer-readable storage media does not include signals and carrier waves. In addition, the term computer-readable storage media does not include communication connections (e.g., 870, 960, 962, and 964).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processing unit;
   memory;
   one or more microphones; and
   a speech-controlled digital personal assistant configured to perform operations comprising:
      receiving speech input generated by a user via the one or more microphones;
      performing speech recognition using the speech input to determine a spoken command, wherein the spoken command comprises a request to perform a task of a third-party application, and wherein the task is identified using a data structure that defines tasks of third-party applications invokable by spoken command, the third-party applications comprising tasks that are capable of being executed using user interfaces of the third-party applications and tasks that are capable of being headlessly executed without using the user interfaces of the third-party applications, and the data structure defining how the task is capable of being executed by the digital personal assistant;
      using the data structure to select between headlessly executing the task of the third-party application and executing the task using the user interface of the third-party application;
      causing the third-party application to execute as a background process to headlessly execute the task when headless execution of the task of the third-party application is selected;
      receiving a response from the third-party application indicating a state associated with the task; and
      providing, by a user interface of the speech-controlled digital personal assistant, a response to the user based on the received state associated with the task so that the response comes from within a context of the user interface of the speech-controlled digital personal assistant without surfacing the user interface of the third-party application.

2. The computing device according to claim 1, wherein using the data structure to select between headlessly executing the task of the third-party application and executing the task using the user interface of the third-party application comprises determining that the data structure defines the task as a background task.

3. The computing device according to claim 1, wherein using the data structure to select between headlessly executing the task of the third-party application and executing the task using the user interface of the third-party application comprises determining that the user is using the computing device in a hands-free mode.

4. The computing device according to claim 1, the operations further comprising initiating a warm-up sequence of the third-party application while performing speech recognition and before completion of determining the spoken command.

5. The computing device according to claim 4, wherein the warm-up sequence includes allocating a portion of the memory, pre-fetching instructions, establishing a communication session, retrieving information from a database, starting a new execution thread, or raising an interrupt.

6. The computing device according to claim 1, wherein the data structure that defines tasks of third-party applications invokable by spoken command includes a mapping of states associated with the tasks to responses to the user.

7. The computing device according to claim 1, the operations further comprising:
   starting a timer when the third-party application is caused to execute as a background process; and
   terminating the background process if the timer expires.

8. The computing device according to claim 1, wherein the response from the third-party application indicates a confirmation state and the response to the user based on the confirmation state prompts the user to respond with a yes or no answer.

9. A method, implemented by a computing device comprising a microphone, the method comprising:
   receiving, by a voice-controlled digital personal assistant, a digital voice input generated by a user, wherein the digital voice input is received via the microphone;
   performing natural language processing using the digital voice input to determine a user voice command, wherein the user voice command comprises a request to perform a pre-defined function of a third-party voice-enabled application, and wherein the pre-defined function is identified using a data structure that defines functions supported by available third-party voice-enabled applications using voice input, the third-party voice-enabled applications comprising pre-defined functions that are capable of being executed using user interfaces of the third-party voice-enabled applications and pre-defined functions that are capable of being headlessly executed without using the user interfaces of the third-party voice-enabled applications, and the data structure defining how the pre-defined function is capable of being executed by the digital personal assistant;
   in response to determining the user voice command comprising the request to perform the pre-defined function of the third-party application, using the data structure to select between headlessly executing the pre-defined function of the third-party voice-enabled application and executing the pre-defined function using the user interface of the third-party voice-enabled application;
   causing the third-party voice-enabled application to execute the pre-defined function as a background process without a user interface of the third-party voice-enabled application appearing on a display of the computing device;
   receiving a response from the third-party voice-enabled application indicating a state associated with the pre-defined function; and
   providing, by a user interface of the voice-controlled digital personal assistant, a response to the user based on the received state associated with the pre-defined function so that the response comes from within a context of the user interface of the voice-controlled digital personal assistant without surfacing the user interface of the third-party voice-enabled application.

10. The method according to claim 9, further comprising initiating a warm-up sequence of the third-party voice-enabled application while performing natural language processing and before completion of determining the user voice command.

11. The method according to claim 10, wherein initiating the warm-up sequence comprises sending a speculative function to the third-party voice-enabled application.

12. The method according to claim 9, wherein the state associated with the pre-defined function is selected from a warm-up, initial, in-progress, confirmation, disambiguate, or final state.

13. The method according to claim 9, wherein the data structure is extensible via a command schema usable to associate requests from the user to pre-defined functions of one or more third-party voice-enabled applications.

14. The method according to claim 9, wherein the data structure comprises:
a first mapping of voice commands to functions supported by available third-party voice-enabled applications; and
a second mapping of states received from the functions to responses provided to the user from the voice-controlled digital personal assistant.

15. The method according to claim 9, wherein the responses provided to the user from the voice-controlled digital personal assistant are selected from the types: display text, text-to-speech, deep-link User Resource Identifier (URI), web link URI, HyperText Markup Language (HTML), list template, physical address, or telephone number.

16. The method according to claim 9, wherein the third-party voice-enabled application is a remote web service.

17. The method according to claim 9, wherein performing natural language processing using the digital voice input to determine a user voice command comprises resolving contextual information so that the user voice command is context-free.

18. A computer-readable storage device storing computer-executable instructions for causing a computing device to perform operations for completing a task of a voice-enabled application within the context of a voice-controlled digital personal assistant, the operations comprising:

receiving, by the voice-controlled digital personal assistant, a digital voice input generated by a user, wherein the digital voice input is received via a microphone;

performing natural language processing using the digital voice input to determine a user voice command, wherein the user voice command comprises a request to perform the task of the voice-enabled application, and wherein the task is identified using an extensible data structure that maps user voice commands to tasks of voice-enabled applications, the voice-enabled applications comprising tasks that are capable of being executed using user interfaces of the voice-enabled applications and tasks that are capable of being headlessly executed without using the user interfaces of the voice-enabled applications, and the data structure defining how the task is capable of being executed by the digital personal assistant;

in response to determining the user voice command, using the data structure to select between executing the task of the voice-enabled application as a foreground task or as a background task;

when the task is selected to be executed as a background task, causing the voice-enabled application to execute the task as a background task and within a context of the voice-controlled digital personal assistant without a user interface of the voice-enabled application surfacing;

receiving a response from the voice-enabled application indicating a state associated with the task; and providing a response to the user based on the received state associated with the task, the response provided within the context of the voice-controlled digital personal assistant without a user interface of the voice-enabled application surfacing when it is determined that the task is a background task.

19. The computer-readable storage device according to claim 18, the operations further comprising initiating a warm-up sequence of the voice-enabled application while performing natural language processing and before completion of determining the user voice command.

* * * * *